(12) United States Patent
Sung et al.

(10) Patent No.: US 12,017,599 B2
(45) Date of Patent: Jun. 25, 2024

(54) AIRBAG FOR SEAT BELT

(71) Applicants: Hyundai Motor Company, Seoul (KR); Kia Corporation, Seoul (KR); Hyundai Mobis Co., Ltd., Seoul (KR)

(72) Inventors: Il Chang Sung, Hwaseong-si (KR); Seok Hoon Ko, Yongin-si (KR); Min June Song, Seoul (KR)

(73) Assignees: Hyundai Motor Company, Seoul (KR); Kia Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/179,727

(22) Filed: Mar. 7, 2023

(65) Prior Publication Data

US 2024/0166154 A1    May 23, 2024

(30) Foreign Application Priority Data

Nov. 23, 2022   (KR) .......................... 10-2022-0158601

(51) Int. Cl.
| | |
|---|---|
| *B60R 21/18* | (2006.01) |
| *B60R 21/231* | (2011.01) |
| *B60R 21/2338* | (2011.01) |
| *B60R 21/2346* | (2011.01) |
| *B60R 21/237* | (2006.01) |

(52) U.S. Cl.
CPC ............ *B60R 21/18* (2013.01); *B60R 21/231* (2013.01); *B60R 21/2338* (2013.01); *B60R 21/2346* (2013.01); *B60R 21/237* (2013.01); *B60R 2021/23382* (2013.01); *B60R 2021/23386* (2013.01)

(58) Field of Classification Search
CPC ... B60R 21/18; B60R 21/2338; B60R 21/237; B60R 21/231; B60R 21/2346; B60R 2021/23382; B60R 2021/23386
USPC ........................................................ 280/733
See application file for complete search history.

(56) References Cited

U.S. PATENT DOCUMENTS

| | | | |
|---|---|---|---|
| 10,933,830 B2 | 3/2021 | Einarsson et al. | |
| 11,390,232 B2 | 7/2022 | Fischer et al. | |
| 2009/0278340 A1* | 11/2009 | Azuma | ............... B60R 21/0136 280/733 |
| 2013/0264803 A1 | 10/2013 | Schneider et al. | |
| 2016/0297396 A1 | 10/2016 | Moeller et al. | |
| 2018/0290615 A1* | 10/2018 | Humbert | .......... B64D 11/06205 |
| 2020/0122668 A1 | 4/2020 | Ozaki et al. | |

(Continued)

FOREIGN PATENT DOCUMENTS

| | | | |
|---|---|---|---|
| CN | 102107641 A | 6/2011 | |
| GB | 2390338 A * | 1/2004 | ............. B60R 21/18 |

(Continued)

*Primary Examiner* — Keith J Frisby
(74) *Attorney, Agent, or Firm* — Slater Matsil, LLP

(57) ABSTRACT

An embodiment airbag for a seat belt includes an airbag cushion deployable from the seat belt, a first support having a shape that widens toward a space in front of a passenger at a lower portion of the airbag cushion when the airbag cushion is in a deployed state, wherein the first support is configured to be supported by thighs of the passenger, and a second support having a shape that widens toward the passenger at an upper portion of the airbag cushion when the airbag cushion is in the deployed state, wherein the second support is configured to support a head of the passenger.

19 Claims, 17 Drawing Sheets

(56) References Cited

U.S. PATENT DOCUMENTS

2021/0129785 A1    5/2021  Fischer et al.
2022/0355755 A1 * 11/2022  Fischer .................. B60R 21/01

FOREIGN PATENT DOCUMENTS

| | | | | |
|---|---|---|---|---|
| GB | 2410010 A * | 7/2005 | ............. | B60R 21/18 |
| JP | 2008183993 A | 8/2008 | | |
| JP | 4847346 B2 | 12/2011 | | |
| JP | 2018515381 A | 6/2018 | | |
| JP | 2020066425 A | 4/2020 | | |
| JP | 2021054250 A | 4/2021 | | |
| JP | 2022032920 A | 2/2022 | | |
| KR | 101051866 B1 | 7/2011 | | |
| KR | 20220000128 A | 1/2022 | | |
| WO | WO-2004089701 A1 * | 10/2004 | ............. | B60R 21/18 |
| WO | 2005068267 A1 | 7/2005 | | |

* cited by examiner

AIRBAG FOR SEAT BELT

CROSS-REFERENCE TO RELATED APPLICATIONS

This application claims the benefit of Korean Patent Application No. 10-2022-0158601, filed on Nov. 23, 2022, which application is hereby incorporated herein by reference.

TECHNICAL FIELD

The present invention relates to an airbag for a seat belt.

BACKGROUND

Airbags are operated in a method in which a high-pressure gas generated from an inflator is filled into the airbag cushion to absorb an impact applied to the body of a passenger in an event of vehicle collision or to restrain movement of the passenger's body.

A module of an airbag includes the inflator generating gas, an airbag cushion filled with the gas to restrain and protect a passenger, and a housing or a mounting plate that receives and fixes the inflator and the airbag cushion.

This airbag module is installed at a part where the airbag module can be sufficiently and solidly fixed, such as an armature of a steering wheel and a cowl crossbar.

However, securing an installation space of the airbag and a deployment path of the airbag cushion is necessary, so there is a problem of deterioration in freedom of vehicle interior design.

Furthermore, it is difficult for the airbag not only to respond to changes in the interior structure, changes in passenger seating postures and seat positions of the airbag, but also to secure excellent protection performance in various situations due to a wide difference in a protection area depending on a difference in physical condition based on the gender and age of a driver.

The foregoing is intended merely to aid in the understanding of the background of the present invention and is not intended to mean that the present invention falls within the purview of the related art that is already known to those skilled in the art.

SUMMARY

The present invention relates to an airbag for a seat belt. Particular embodiments relate to an airbag for a seat belt in which an airbag cushion is deployed from the seat belt to secure a certain protection region for a passenger, regardless of passenger seating types, types of passengers, etc.

Embodiments of the present invention address problems occurring in the related art, and embodiments of the present invention provide an airbag for a seat belt, the airbag being configured to deploy an airbag cushion from the seat belt to secure a certain protection region for a passenger, regardless of passenger seating types, types of passengers, etc.

In order to achieve preferred features, according to embodiments of the present invention, an airbag for a seat belt includes an airbag cushion deployable from the seat belt, a first support formed into a shape that may widen toward a space in front of a passenger at a lower portion of the airbag cushion and configured to be supported by thighs of the passenger, and a second support formed into a shape that may widen toward the passenger at an upper portion of the airbag cushion and configured to support the head of the passenger.

The first support may be formed such that a lower surface of the airbag cushion may transversely widen from the passenger toward the space in front of the passenger.

The second support may be formed such that an upper surface of the airbag cushion may transversely widen from the space in front of the passenger toward the passenger.

A tether may be connected to opposite inner surfaces of the airbag cushion while being located therebetween.

A front surface region may be formed into a shape that may transversely widen from an upper front end of the airbag cushion toward a lower front end of the airbag cushion.

A tether may be connected to lateral surface regions respectively connected to opposite lateral portions of the front surface region while being located therebetween, and the tether may be connected to the lateral surface regions to lean toward a transversely narrowed portion of the front surface region.

A rear surface region may be formed into a shape that may transversely widen from a lower rear end of the airbag cushion toward an upper rear end of the airbag cushion, a tether may be connected to lateral surface regions respectively connected to opposite lateral portions of the rear surface region while being located therebetween, and the tether may be connected to the lateral surface regions to lean toward a transversely narrowed portion of the rear surface region.

The tether may be further connected to at least one of a front surface and an upper surface of the airbag cushion.

The airbag may further include an inner hose through which gas supplied from an inflator may pass and be supplied into the airbag cushion, the inner hose being made of a material with airtightness; and an outer hose formed into a shape wrapping the inner hose and made of a material with higher strength than the inner hose.

A circumference of the inner hose may be formed longer than a circumference of the outer hose.

The inflator and the inner hose may be fastened to each other by a first fastener, the outer hose may be formed longer toward the inflator than the inner hose, and the inflator and the outer hose may be fastened to each other by a second fastener.

A hose fixing part may be formed by partially extending an end of the outer hose in a longitudinal direction of the outer hose, and the hose fixing part may be connected to the airbag cushion.

The hose fixing part and the airbag cushion may be connected to each other by a connector, or the hose fixing part may be directly connected to the airbag cushion.

The airbag cushion may include a first panel including a first region having a shape that may transversely widen from a first end toward a second end thereof, second regions formed to be folded at opposite sides of the first region, and a third region formed to be folded at the second end of the first region, and a second panel including a fourth region having a shape that may transversely narrow from a first end to a second end thereof, fifth regions formed to be folded at opposite sides of the fourth region, and a sixth region formed to be folded at the first end of the fourth region, wherein an edge of the first panel and an edge of the second panel may be connected to each other to form the airbag cushion.

The airbag cushion may include a first panel including first lateral surface regions formed to be folded at opposite sides of the front surface region of the airbag cushion and a lower surface region formed to be folded at a lower end of the front surface region and a second panel including second lateral surface regions folded at opposite sides of the rear surface region of the airbag cushion and an upper surface region folded at an upper end of the rear surface region, wherein an edge of the first panel and an edge of the second panel may be connected to each other to form the airbag cushion.

Each of the first lateral surface regions may have a shape that may transversely narrow from an upper end toward a lower end thereof, and each of the second lateral surface regions may have a shape that may transversely widen from an upper end toward a lower end thereof.

A first inlet region may be formed to extend at an end of the lower surface region, a second inlet region may be formed to extend at ends of the second lateral surface regions, and an edge of the first inlet region and an edge of the second inlet region may be connected to each other to form a gas inlet.

A gas inlet may be formed at an end of the airbag cushion, a diffuser may be connected to the gas inlet and an inflator while being located therebetween, and the diffuser may have a shape in which a sectional area of a passage may widen from the inflator toward the gas inlet.

An external tether may be connected to a webbing of the seat belt where the airbag cushion may be deployed and the airbag cushion while being located therebetween.

The airbag may further include a hose unit configured to supply gas supplied from an inflator to the airbag cushion and a webbing fixing part formed by protruding on an outer surface of the hose unit and fixed in a shape that may wrap a webbing of the seat belt.

As described above, according to embodiments of the present invention, the airbag cushion is deployed such that the lower end thereof has the shape that widens toward a space in front of the passenger, so that there is an effect of stably restraining the upper body of the passenger as the airbag cushion is supported by the upper parts of the passenger's legs. Furthermore, the airbag cushion is deployed such that an upper end thereof has the shape that widens toward the passenger, so that there is an effect of safely protecting the passenger as a region where the head of the passenger is supported widens.

Furthermore, the airbag cushion has the shape that transversely narrows at both of the upper and lower portions, so that the protection region of the passenger is secured and the entire size and volume of the airbag cushion are reduced. Therefore, there are advantages of preventing deterioration of the comfort of wearing of the seat belt when the airbag cushion is received inside the seat belt and of reducing the capacity of the inflator.

DETAILED DESCRIPTION OF ILLUSTRATIVE EMBODIMENTS

Figure 1:
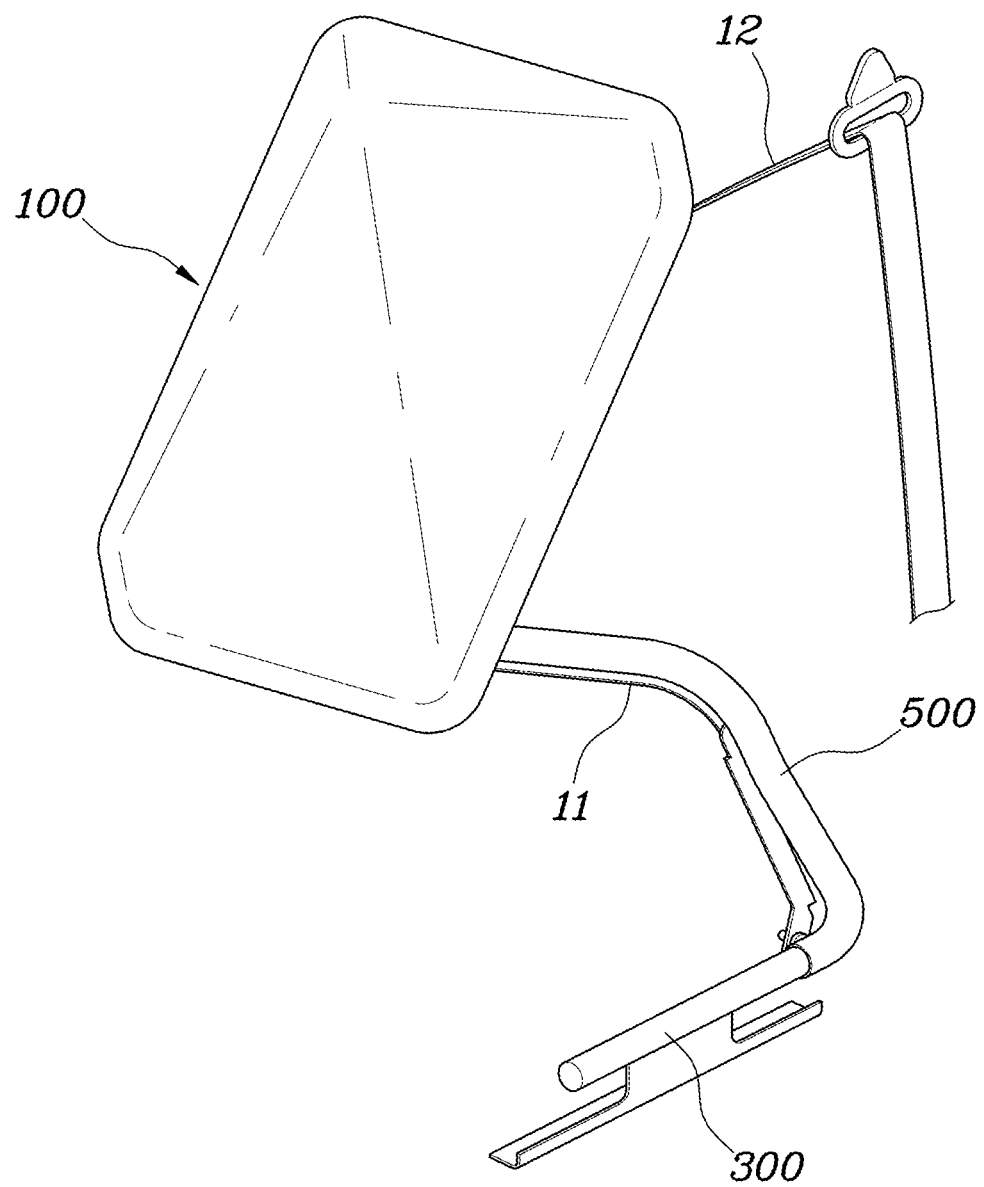
FIG. 1 is a view showing a deployed state of an airbag cushion on a seat belt according to embodiments of the present invention.

Hereinbelow, preferred embodiments described in the specification will be described in detail with reference to accompanying drawings, and regardless of the reference numerals, the same reference numerals will refer to the same or like parts, and redundant descriptions thereof will be omitted.

The suffixes "module" and "part" for the components used in the following description are given or interchanged in consideration of only the ease of writing the specification, and do not have distinct meanings or roles by themselves.

In the following description, if it is decided that the detailed description of a known function or configuration related to embodiments of the invention makes the subject matter of embodiments of the invention unclear, the detailed description is omitted. Furthermore, the accompanying drawings are only for understanding of the preferred embodiments of the present invention, and the technical ideas disclosed in the specification are not limited by the accompanying drawings, and those skilled in the art will appreciate that various modifications, additions and substitutions are possible, without departing from the scope and spirit of the invention as disclosed in the accompanying claims.

It will be understood that, although the terms first and/or second, etc. may be used herein to describe various elements, these elements should not be limited by these terms. These terms are only used to distinguish one element from another element.

It is to be understood that when one element is referred to as being "connected to" or "coupled to" another element, it may be connected directly to or coupled directly to another element or be connected to or coupled to another element having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Figure 2:
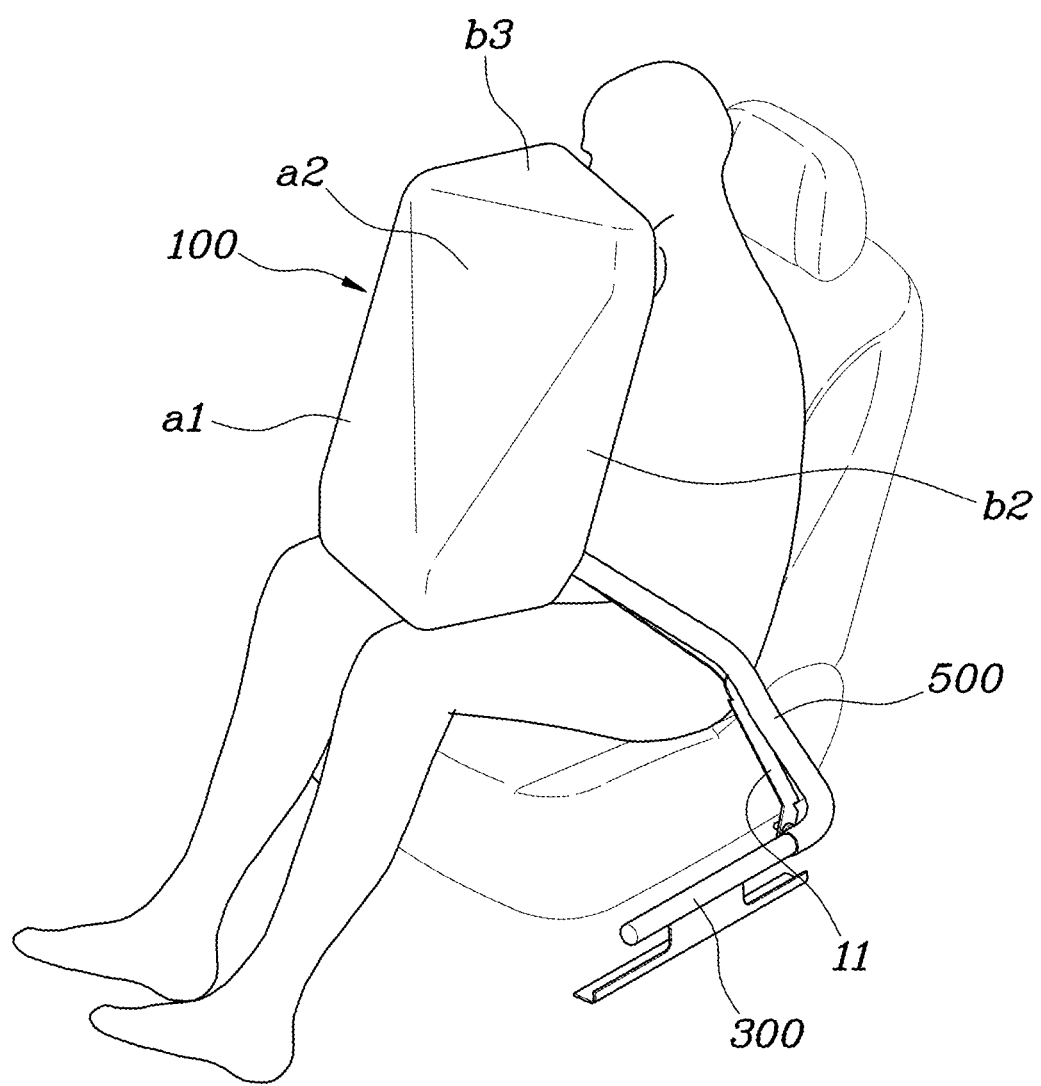
FIG. 2 is a view showing a deployed state of the airbag cushion while a passenger sits on a seat according to embodiments of the present invention.

FIG. 1 is a view showing a deployed state of an airbag cushion 100 on a seat belt 12 according to embodiments of the present invention. FIG. 2 is a view showing a deployed state of the airbag cushion 100 while a passenger sits on a seat according to embodiments of the present invention.

Referring to the drawings, the airbag for a seat belt according to embodiments of the present invention includes the airbag cushion 100 deployed from the seat belt 12, a first support no formed into a shape that widens toward the space in front of the passenger at a lower portion of the airbag cushion 100 and configured to be supported by thighs of the passenger, and a second support 120 formed into a shape that widens toward the passenger at an upper portion of the airbag cushion 100 and configured to support the head of the passenger.

For example, in a sitting type in which passengers face each other, there is no structure to which an airbag in front the passenger may be installed.

Therefore, as the airbag cushion 100 is deployed from a wrap webbing 11 of the seat belt 12, the wrap webbing wrapping the waist of the passenger, the airbag cushion 100 is deployed at the space in front of the passenger and protects the passenger.

Specifically, as the airbag cushion 100 is deployed such that the lower portion of the airbag cushion 100 widens toward the space in front of the passenger, the widely deployed portion of the airbag cushion 100 is supported by the thighs of the passenger, thereby preventing the airbag cushion 100 from slipping between both legs of the passenger.

Furthermore, when a partition wall is disposed at the space in front of the passenger, it is necessary to deploy the airbag cushion 100 between the passenger and the partition wall to protect the passenger.

Therefore, the airbag cushion 100 is deployed into a shape of which the upper portion widens toward the passenger, so that the head of the passenger is supported by the widely deployed portion of the airbag cushion 100 and thus the passenger is protected.

Figure 3:
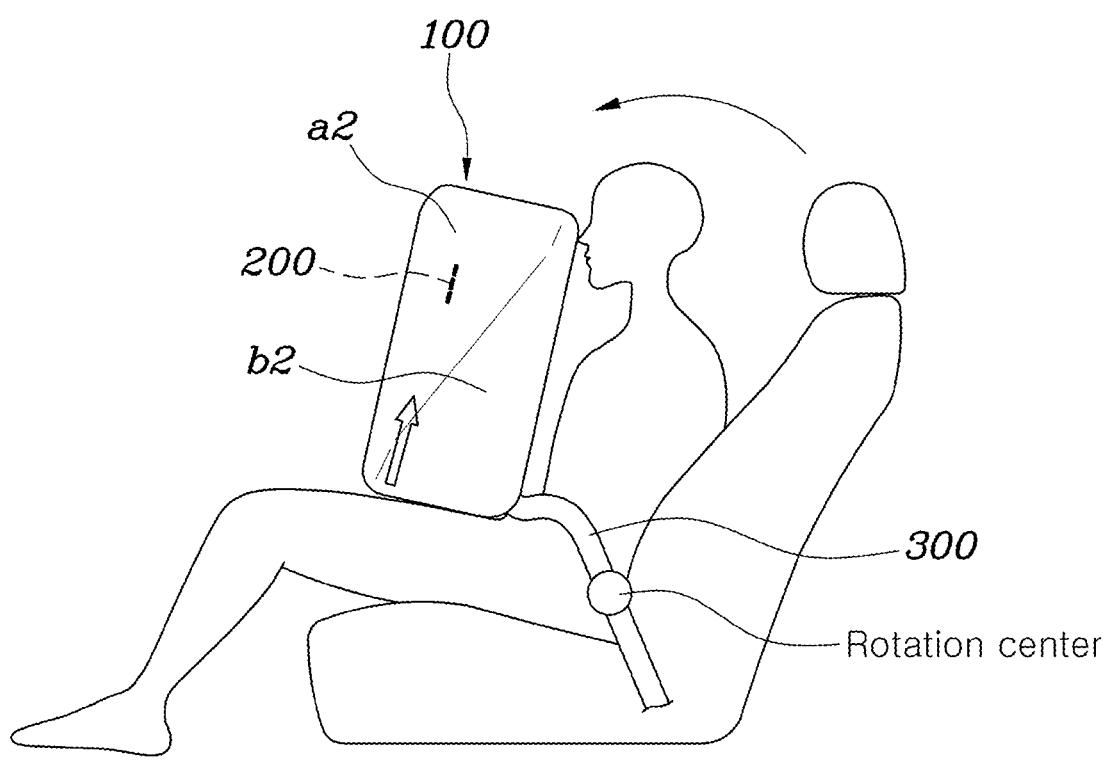
FIG. 3 is a view showing the airbag cushion of FIG. 2, the view being taken from the side of the passenger.
Figure 4:
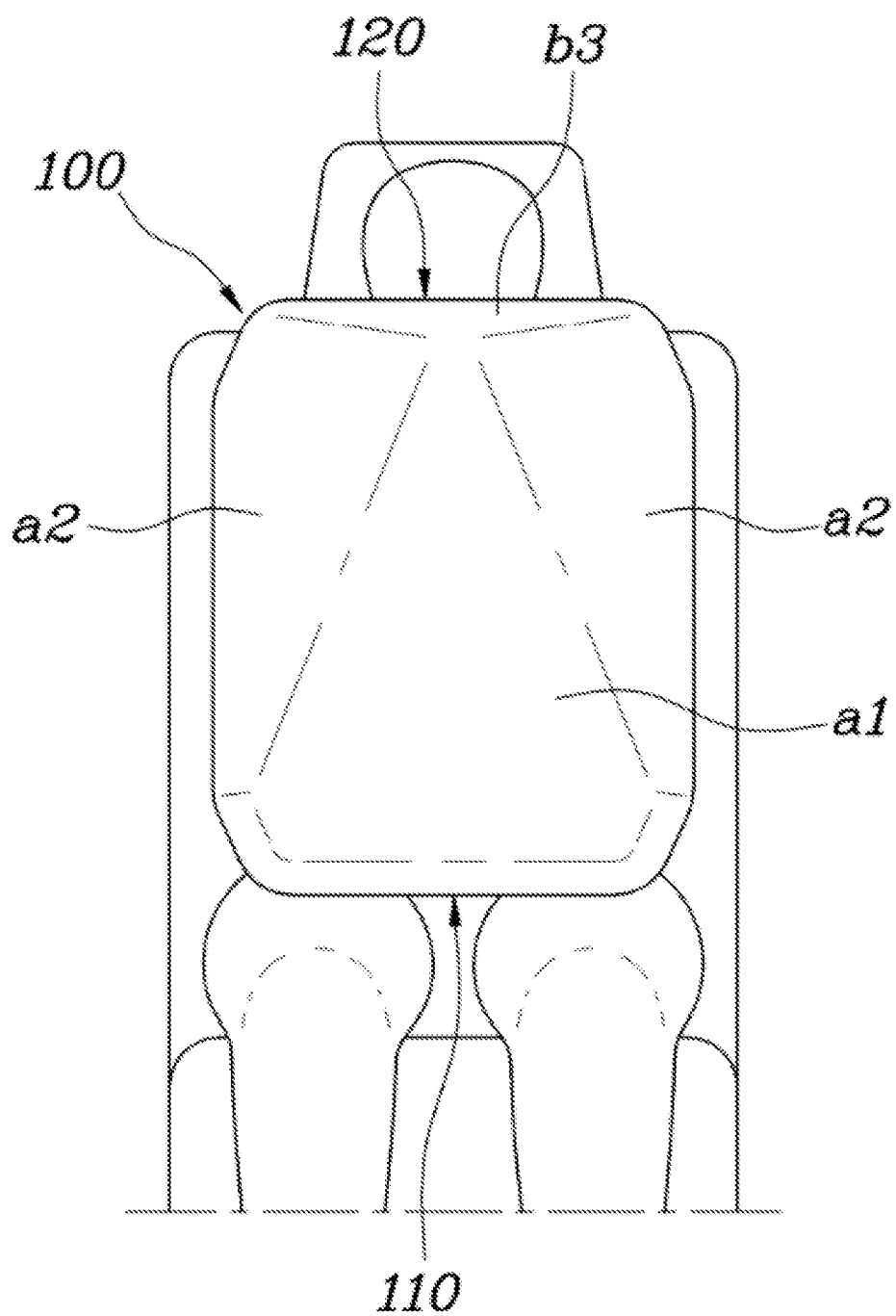
FIG. 4 is a view showing the airbag cushion of FIG. 2, the view being taken from the front side of the passenger.
Figure 5:
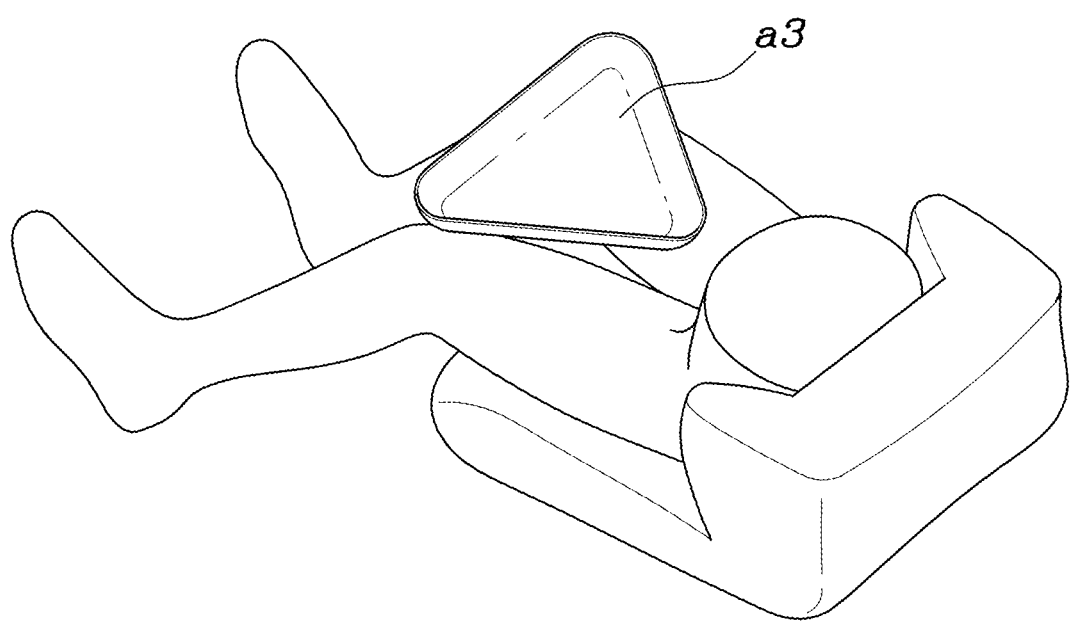
FIG. 5 is a view showing a cut-out lower portion of the airbag cushion according to embodiments of the present invention.

FIG. 3 is a view showing the airbag cushion of FIG. 2, the view being taken from the side of the passenger. FIG. 4 is a view showing the airbag cushion of FIG. 2, the view being taken from the front side of the passenger. FIG. 5 is a view showing a cut-out lower portion of the airbag cushion 100 according to embodiments of the present invention.

Referring to the drawings, the first support no may be formed such that a lower surface of the airbag cushion 100 transversely widens from the passenger toward the space in front of the passenger.

For example, the first support no is supported by the thighs of the passenger and restrains the upper body of the passenger.

Specifically, when a collision occurs, the seat belt 12 primarily restrains the body of the passenger.

At this point, the body of the passenger is rotatably moved on the pelvis close to the center of gravity of the body, so that the airbag cushion 100 restrains the rotation movement of the upper body of the passenger.

In addition, the airbag cushion should supply sufficient support force when restraining the upper body and must not lose its restraining force due to occurrence of leftward and rightward shaking.

Specifically, in an event of collision, since the knees of the passenger may spread, the airbag cushion 100 is formed such that the lower surface thereof gradually widens from the pelvis of the passenger toward the space in front of the passenger.

As described above, as the knee-side portion of the airbag cushion 100 is deployed broadly, the airbag cushion 100 is prevented from slipping between the knees or shaking transversely. Furthermore, as the airbag cushion provides a restraining force to the portion far from the rotation center, a stronger support force can be supplied.

In addition, the second support 120 may be formed such that the upper surface of the airbag cushion 100 gradually widens from the space in front of the passenger toward the passenger, so that the head of the passenger can be supported.

For example, the second support 120 may be supported by the head of the passenger.

Specifically, when a collision occurs while a structure is located at the space in front of the passenger, and the upper body of the passenger rotates, a risk of colliding the head with the structure is increased. In order to prevent a collision between the structure and the passenger's head, the airbag cushion 100 should be deployed in a space between the structure and the passenger's head.

Therefore, a longitudinal length of the airbag cushion 100 is maintained and a rear surface of the airbag cushion 100 in contact with the head of the passenger is formed to transversely widen, and even when some of the upper body is transversely shaken, the head of the passenger can be safely restrained by the airbag cushion 100.

Furthermore, the airbag cushion 100 is formed to transversely narrow from the passenger toward the space in front of the passenger, so that the airbag cushion can supply sufficient protection area and reduce the entire volume of the airbag cushion 100.

Therefore, as the size of the airbag cushion 100 is reduced, it is possible to prevent reduction of the comfort of wearing of the seat belt 10 while the airbag cushion 100 is stored in the seat belt 10 and to reduce the capacity of an inflator 300.

Meanwhile, according to embodiments of the present invention, a tether 200 may be connected to both of opposite lateral surfaces of the airbag cushion 100 while being located therebetween.

In other words, the airbag cushion 100 is made of a fabric material, and when the airbag cushion 100 expands by gas, all surfaces thereof are inflated round, so it is difficult to deploy the airbag cushion 100 such that the upper portion and the lower portion thereof have the shapes that transversely narrow.

Therefore, as left and right inner surfaces of the airbag cushion 100 are connected to each other by the tether 200, the airbag cushion 100 is prevented from being excessively inflated in a transverse direction, and the airbag cushion 100 can be deployed such that the upper and lower portions thereof have the shapes that transversely narrow.

Figure 6:
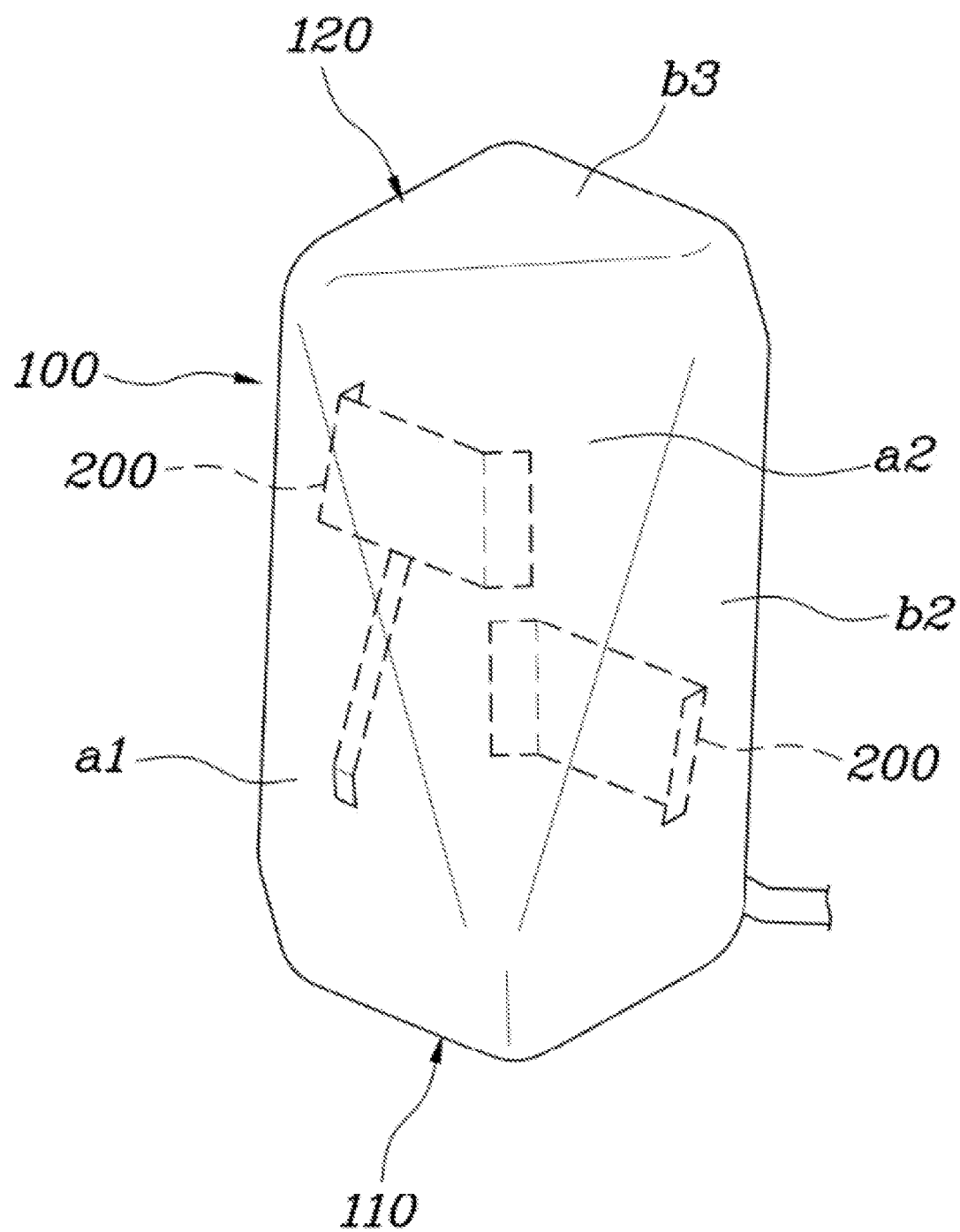
FIG. 6 is a view showing an installation structure of a tether according to a first embodiment of the present invention.

In addition, FIG. 6 is a view showing an installation structure of a tether 200 according to a first embodiment of the present invention. The deployed shape of the airbag cushion 100 may be changed in response to an installed position of the tether 200.

Referring to the drawings, a front surface region a1 is formed into a shape that transversely widens from an upper front end of the airbag cushion 100 toward a lower front end of the airbag cushion 100, and the tether 200 is connected both of the lateral surface regions respectively connected to opposite lateral portions of the front surface region a1 while being located therebetween, and the tether 200 may be connected to the lateral surface regions to lean toward a transversely narrowed portion of the front surface region a1.

For example, the front surface region a1 of the airbag cushion 100, which faces the space in front of the passenger, is formed into a triangular surface. A left lateral surface region and a right lateral surface region are respectively connected to a left portion and a right portion of the triangular front surface region a1. Opposite ends of the tether 200, which are formed into surface shapes, may be respectively fixed to the left and right surfaces.

At this point, with an intermediate position in the vertical height of the front surface region a1 as the center, the opposite ends of the tether 200 are fixed to upper ends of the left surface and the right surface, which are located at the narrowed side of the triangle.

Therefore, excessive inflation of the airbag cushion 100 by the gas at the transversely narrowed portion thereof is prevented, so that the shape of the tether 200 can be efficiently controlled.

Furthermore, a rear surface region b1 is formed into a shape that transversely widens from a lower rear end of the airbag cushion 100 toward an upper rear end of the airbag cushion wo, and a tether 200 is connected to both of lateral surface regions respectively connected to opposite lateral portions of the rear surface region b1 while being located therebetween, and the tether 200 may be connected to the lateral surface regions to lean toward a transversely narrowed portion of the rear surface region b1.

For example, the rear surface region b1 of the airbag cushion 100, which faces the space in front of the passenger, is formed into an inverted triangular surface. A left lateral surface region and a right lateral surface region are connected to a left portion and a right portion of the inverted triangular rear surface region b1. Opposite ends of the tether 200, which are formed into surface shapes, may be respectively fixed to the left and right lateral surfaces.

At this point, with an intermediate position in the vertical height of the rear surface region b1 as the center, the opposite ends of the tether 200 are fixed to lower ends of the left surface and the right surface, which are located at the narrowed side of the triangle.

Therefore, excessive inflation of the airbag cushion 100 by the gas at the transversely narrowed portion thereof is prevented, so that the shape of the tether 200 can be efficiently controlled.

Figure 7:
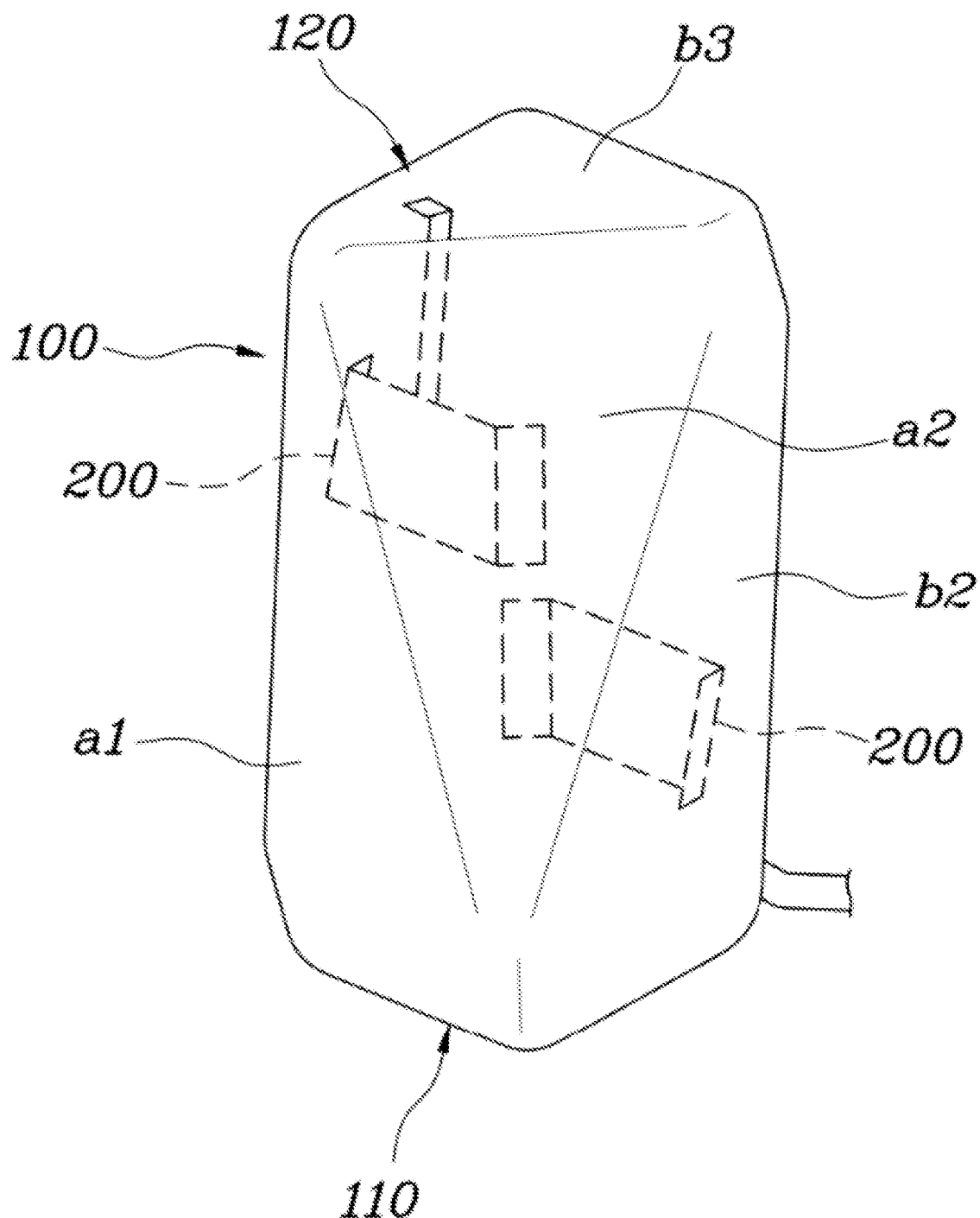
FIG. 7 is a view showing an installation structure of a tether according to a second embodiment of the present invention.
Figure 8:
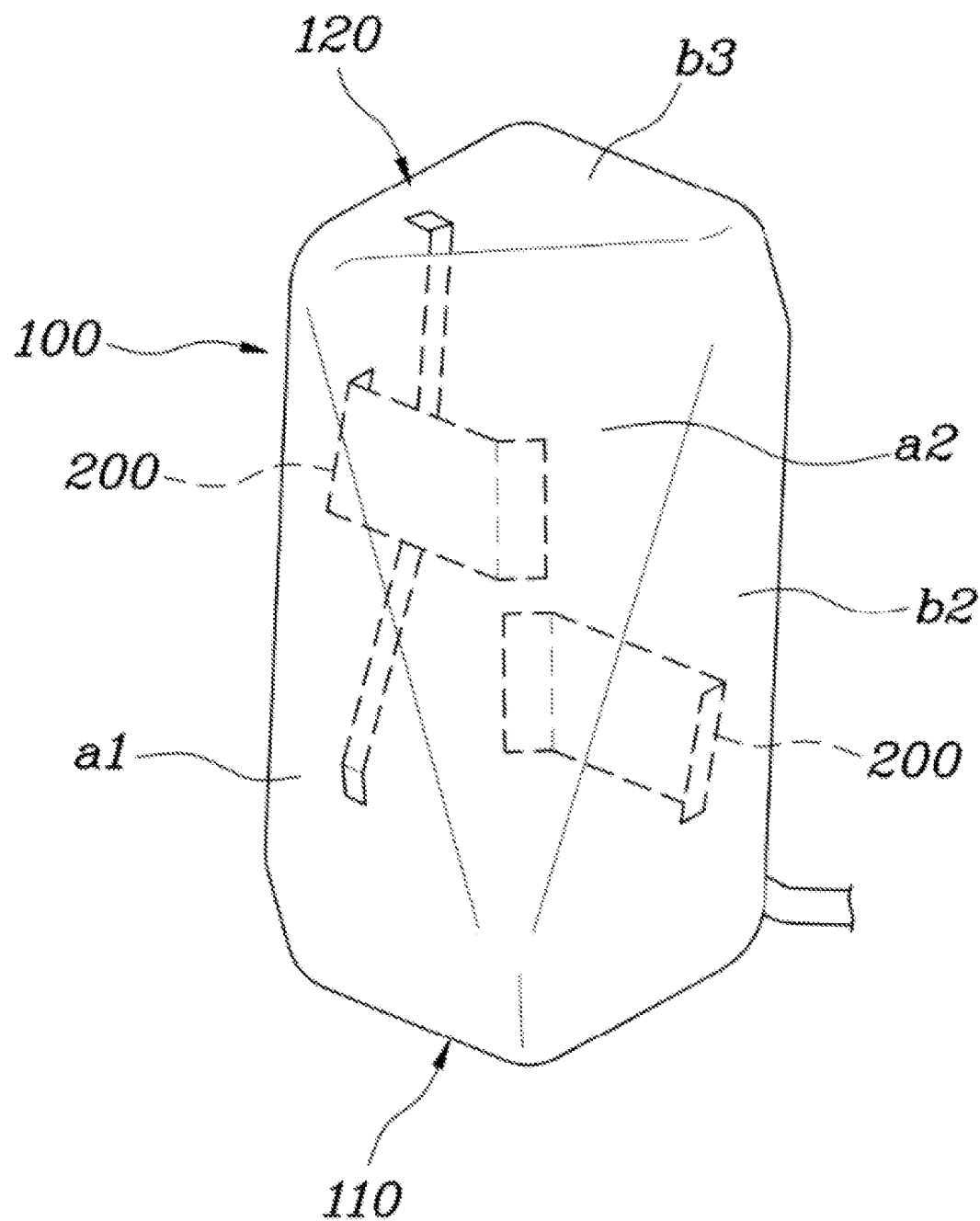
FIG. 8 is a view showing an installation structure of a tether according to a third embodiment of the present invention.

FIG. 7 is a view showing an installation structure of a tether 200 according to a second embodiment of the present invention. FIG. 8 is a view showing an installation structure of a tether 200 according to a third embodiment of the present invention.

Referring to the drawings, the tether 200 may be further connected to at least one of the front surface and the upper surface of the airbag cushion 100.

For example, a portion of the tether 200 extends long into a strap shape, and an end thereof may be additionally connected to the inner surface of the airbag cushion 100.

In other words, as shown in FIG. 6, as the opposite ends of the tether 200 are fixed to the left surface and the right surface of the front surface region a1, the strap-shaped end of the tether 200 may be fixed to the front surface region a1 of the airbag cushion 100.

In addition, as shown in FIG. 7, as the opposite ends of the tether 200 are fixed to the left surface and the right surface of the front surface region a1, the strap-shaped end of the tether 200 may be fixed to the upper surface of the airbag cushion 100.

Furthermore, as shown in FIG. 8, as the opposite ends of the tether 200 are fixed to the left surface and the right surface of the front surface region a1, strap-shaped ends of the tether 200 may be respectively fixed to the front surface region a1 and the upper surface of the airbag cushion 100.

Figure 9:
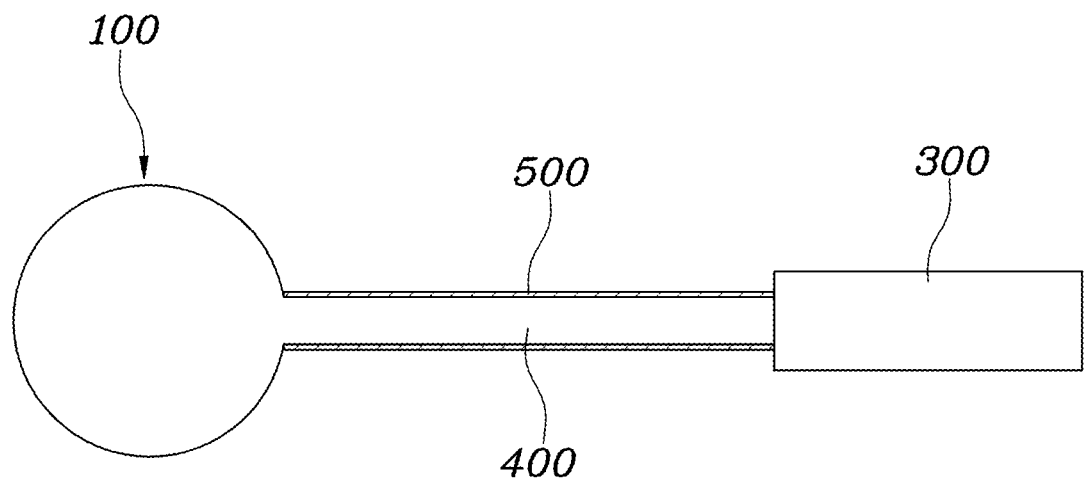
FIG. 9 is a view showing a hose unit connection structure according to a fourth embodiment of the present invention.

Meanwhile, FIG. 9 is a view showing a hose unit connection structure according to a fourth embodiment of the present invention.

Referring to the drawing, a hose unit includes an inner hose 400 through which gas supplied from the inflator 300 passes to be supplied into the airbag cushion 100 and made of a material having airtightness, and an outer hose 500 formed into a shape wrapping the inner hose 400 and made of a material having the rigidity higher than the rigidity of the inner hose 400.

Specifically, a first end of the hose unit is connected to the airbag cushion 100, and a second end of the hose unit is connected to the inflator 300.

The hose unit has a two-or-more-layers structure, has the shape in which the outer hose 500 wraps the inner hose 400, and is made of different materials for each of the inner hose 400 and the outer hose 500.

Furthermore, the inner hose 400 is made of the material that is flexible and has airtightness higher than the outer hose 500 to prevent leakage of the gas. For example, the inner hose 400 is integrally formed with the airbag cushion 100 and is formed into a shape formed by a portion of the airbag cushion 100 extending.

For example, the inner hose 400 may be made of the material such as inner-coated PET, nylon, etc. for low permeability.

The outer hose 500 is made of a material that is flexible and has tensile strength higher than the inner hose 400 so as to endure strong pressure of the gas ejected from the inflator 300.

For example, the outer hose 500 may be made of a sufficiently thick material such as uncoated PET, nylon, aramid, etc. or cotton fabric.

Furthermore, the outer hose 500 has a cylindrical shape. However, the outer hose 500 is not formed by sewingprocessing a flat fabric into the cylindrical shape, but the outer hose 500 itself is made cylindrical thereby improving the strength.

To expand on the above structure, the most important point in the hose structure is to endure the strong pressure of the gas.

The gas hose applied to the airbag may be made of a material that is flexible and has great strength. Furthermore, in order to transfer the gas to the airbag cushion 100 without loss of the gas, there must be no leakage of the gas through a hose surface.

However, in the material with high strength and low permeability, there is an expensive or poor machinability problem.

Therefore, according to embodiments of the present invention, the outer hose 500 having high strength is coupled to the outside of the inner hose 400 having low permeability to form the hose unit, so that the hose unit can endure the pressure of the gas and leakage of the gas from the hose unit can be prevented.

Figure 10:
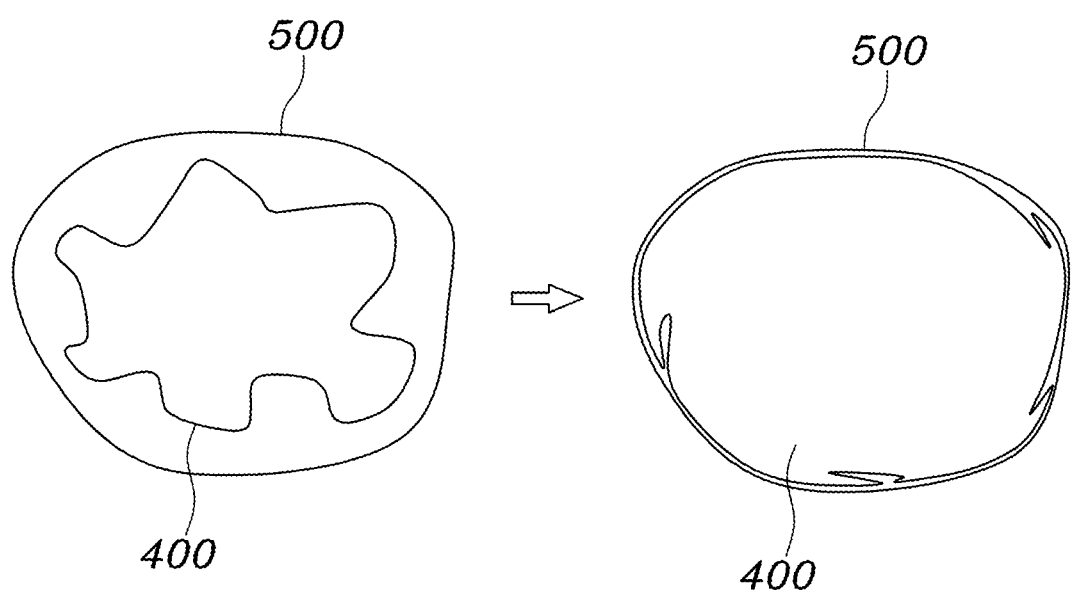
FIG. 10 is a view showing before and after shapes of deployment of an inner hose according to embodiments of the present invention.

In addition, FIG. 10 is a view showing before and after shapes of the inner hose 400 according to embodiments of the present invention.

Referring to FIG. 10, a circumference of the inner hose 400 may be formed longer than or equal to a circumference of the outer hose 500.

Therefore, when the gas of the inflator 300 is supplied into the inner hose 400, the airtightness of the inner hose 400 prevents the gas from leaking out and the inner hose 400 expands.

At this point, since the sectional circumference of the inner hose 400 is formed longer than or equal to the sectional circumference of the outer hose 500, before the inner hose 400 expands and is stretched, the expansion of the inner hose 400 is limited by the outer hose 500, and expansion pressure of the gas is transferred to the outer hose 500.

Furthermore, the outer hose 500 may endure great expansion pressure, and may supply the gas while preventing leakage of the gas along with the inner hose 400 having high airtightness.

Figure 11:
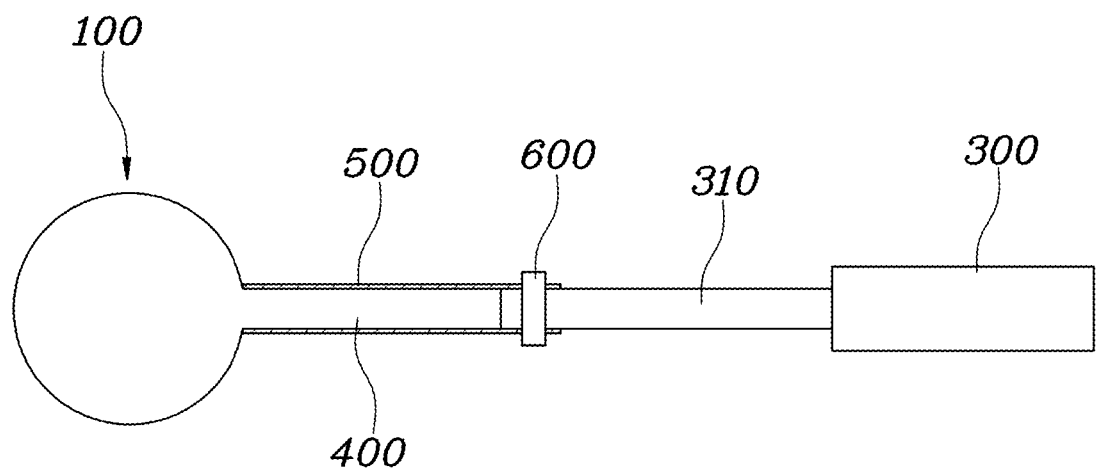
FIG. 11 is a view showing a hose unit connection structure according to a fifth embodiment of the present invention.

FIG. 11 is a view showing a hose unit connection structure according to a fifth embodiment of the present invention.

Referring to the drawing, the inflator 300, the inner hose 400, and the outer hose 500 may be fastened to each other by a fastener 600.

In other words, the inner hose 400 and the outer hose 500 are connected with the inflator 300 or an end of a hard pipe member 310, and the fastener 600 such as a clamp is fastened to the connected portion, so that the inner hose 400 and the outer hose 500 may be fastened to each other using the one fastener 600. In FIG. 11, the end of the hard pipe member is inserted into the inner hose 400 and outer hose 500.

However, when the inner hose 400 and the outer hose 500 are fastened to each other by the one fastener 600, a hole that causes gas leakage may be opened due to wrinkling of the inner hose 400, and furthermore, when the hose tightened by the fastener 600 is thick, fastening may be unstable.

Therefore, in embodiments of the present invention, the inner hose 400 and the outer hose 500 may be fastened to each other by different fasteners.

Figure 12:
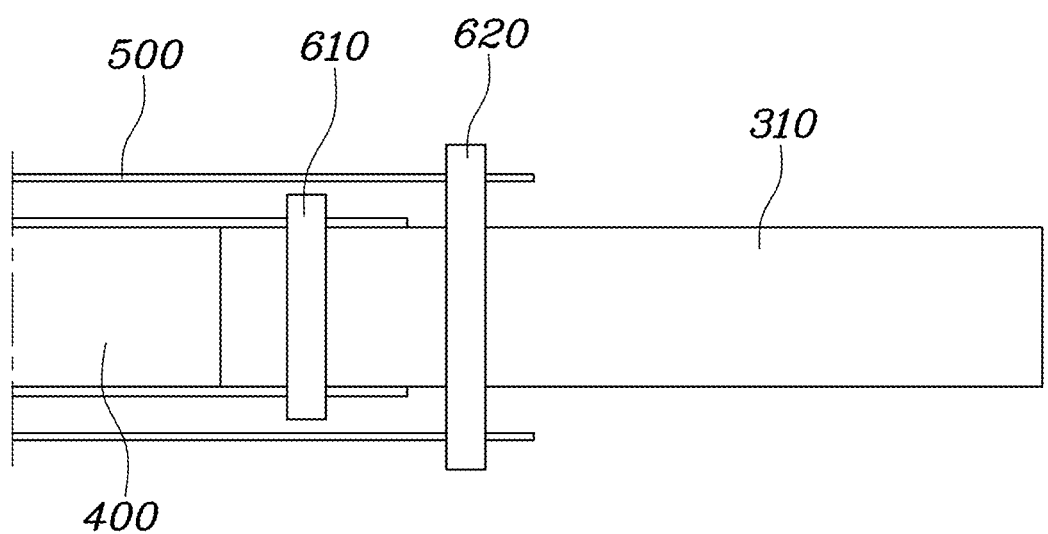
FIG. 12 is a view showing a hose unit connection structure according to a sixth embodiment of the present invention.

FIG. 12 is a view showing a hose unit connection structure according to a sixth embodiment of the present invention. Referring to the drawing, the inflator 300 and the inner hose 400 are fastened to each other by a first fastener 610. The outer hose 500 is formed longer toward the inflator 300 than the inner hose 400, and the inflator 300 and the outer hose 500 may be fastened to each other by a second fastener 620.

In other words, while the inner hose 400 is connected to the inflator 300 or the end of the pipe member 310, the inner hose is fastened to the inflator by using the first fastener 610.

Then, while the outer hose 500 is formed longer than the inner hose 400 and is connected to the inflator 300 or the end of the pipe member 310, the outer hose 500 is fastened to the inflator by using the second fastener 620.

Accordingly, without risk of damage to the inner hose 400, the hose unit and the inflator 300 can be stably fastened to each other.

Meanwhile, according to embodiments of the present invention, a hose fixing part 510 is formed by an end of the outer hose 500 partially extending in a longitudinal direction thereof, and the hose fixing part 510 may be connected to the airbag cushion 100.

In addition, the hose fixing part 510 and the airbag cushion 100 may be connected to each other by a connector 520 located therebetween, and the hose fixing part 510 may be directly connected to the airbag cushion 100.

Figure 13:
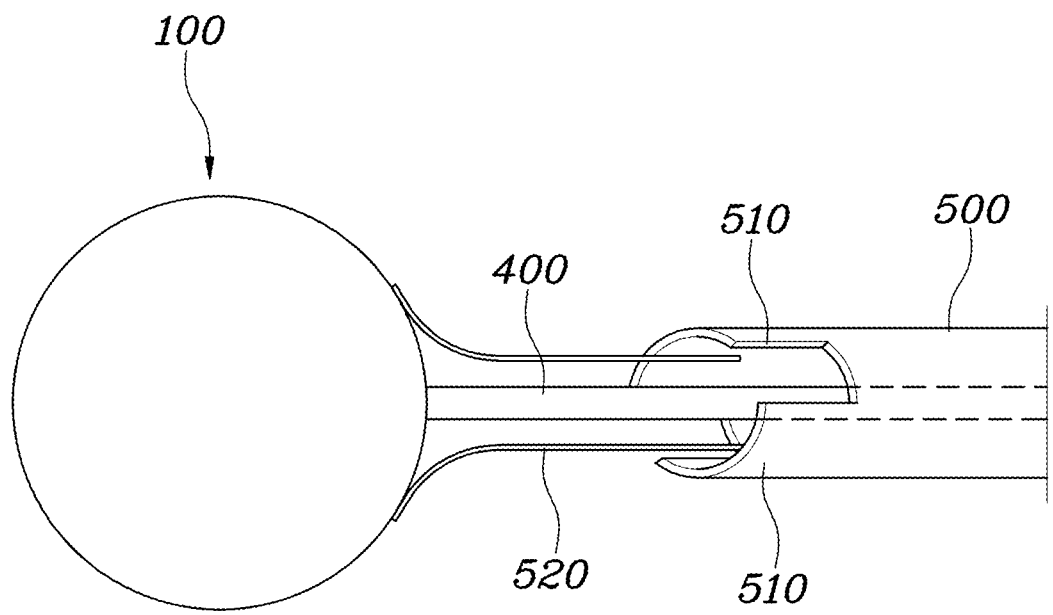
FIG. 13 is a view showing an outer hose connection structure using a hose fixing part and a connector according to embodiments of the present invention.

Hereinbelow, FIG. 13 is a view showing the outer hose connection structure using the hose fixing part 510 and the connector 520 according to embodiments of the present invention. The hose fixing part 510 is formed into a shape that partially extends along an edge of the end of the outer hose 500 toward the airbag cushion 100.

At this time, the hose fixing part 510 may be made of a fabric material, may include one or more hose fixing parts 510, and may have a saw-toothed shape.

Furthermore, the connector 520 may be connected to an outer surface of the airbag cushion 100 toward the hose fixing part 510. At this point, the connector 520 may be formed to be integrated with the airbag cushion 100.

Then, as the connector 520 is sewn on the hose fixing part 510, connection between the airbag cushion 100 and the outer hose 500 may be easily achieved.

Figure 14:
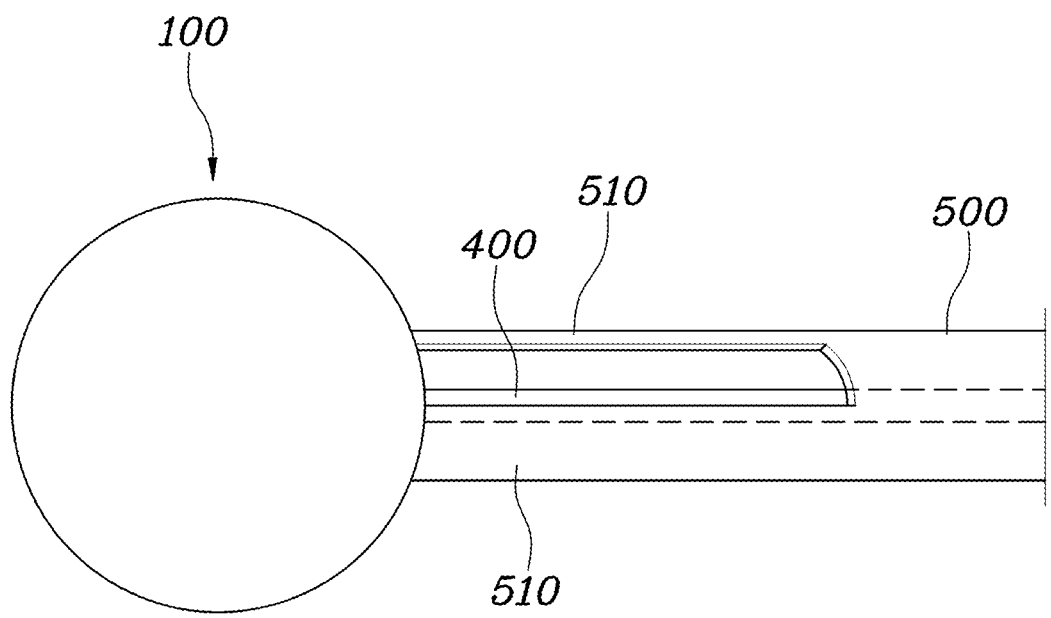
FIG. 14 is a view showing an outer hose connection structure using the hose fixing part according to embodiments of the present invention.

As another embodiment of fixing the outer hose 500 and the airbag cushion 100 to each other, FIG. 14 is a view showing the outer hose connection structure using the hose fixing part 510 according to embodiments of the present invention.

Referring to the drawing, the hose fixing part 510 is formed into a shape that partially protrudes along an edge of the end of the outer hose 500 toward the airbag cushion 100.

Specifically, the hose fixing part 510 may be formed into a shape that extends to the outer surface of the airbag cushion 100 and may be directly sewn on the outer surface of the airbag cushion 100.

In this structure, since there is no need to form the connector 520 at the airbag cushion 100, connection between the airbag cushion 100 and the outer hose 500 can be further easily performed.

Figure 15:
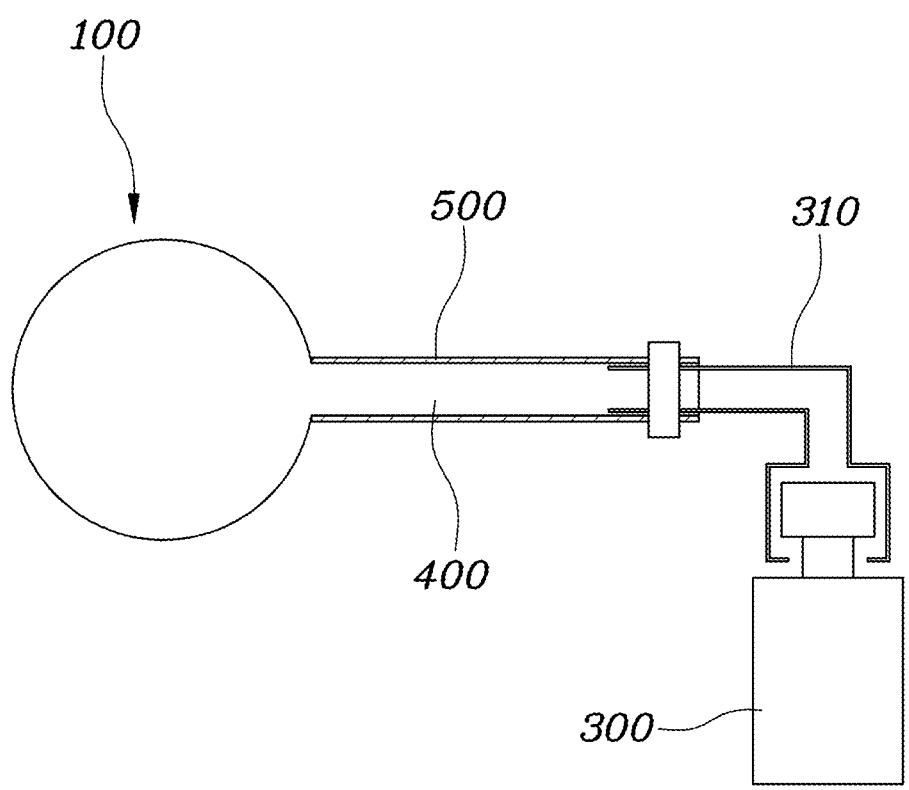
FIG. 15 is a view showing a bent shape of a pipe member according to embodiments of the present invention.

FIG. 15 is a view showing a bent shape of the pipe member 310 according to embodiments of the present invention.

Referring to the drawing, when the hose unit is installed to be bent, a flow of the gas is stagnant at the bent portion to increase pressure of the stagnant portion thereby causing damage to the hose unit.

Accordingly, the hard pipe member 310 is installed at the bent portion, and the pipe member 310 is connected to the hose unit, so that the hose unit can be prevented from being damaged.

For example, a first end of the pipe member 310 is connected to the inflator 300, a second end of the pipe member 310 is connected to the hose unit, and the pipe member 310 and the hose unit are fastened to each other by a clamp. Therefore, without gas leakage, the gas can be supplied into the airbag cushion 100.

Figure 16:
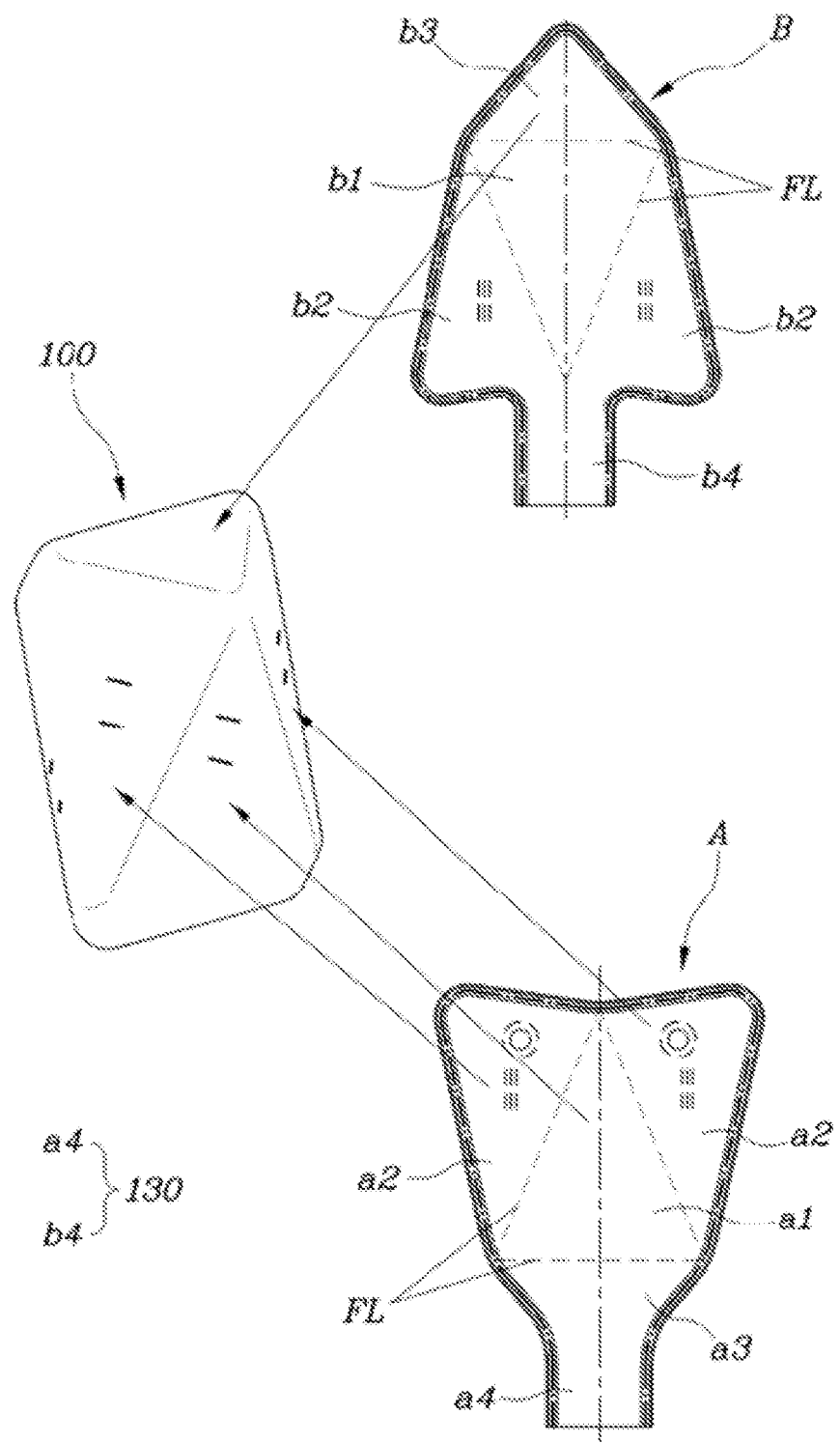
FIG. 16 is a view separately showing a first panel and a second panel of the airbag cushion of embodiments of the present invention.

Meanwhile, FIG. 16 is a view separately showing a first panel A and a second panel B forming the airbag cushion 100 according to embodiments of the present invention.

Referring to the drawing, the airbag cushion 100 includes the first panel A including a first region having a shape that transversely widens from a first end toward a second end thereof, second regions formed to be folded at opposite sides of the first region, and a third region formed to be folded at the second end of the first region, and the second panel B including a fourth region having a shape that transversely narrows from a first end toward a second end thereof, fifth regions formed to be folded at opposite sides of the fourth region, and a sixth region formed to be folded at the first end of the fourth region. As an edge of the first panel A and an edge of the second panel B are connected to each other, the airbag cushion 100 can be formed.

As described above, the first region to the sixth region are formed into surface shapes and are connected to each other, so that the airbag cushion 100 may be formed into a polyhedral shape.

For example, the airbag cushion 100 includes the first panel A in which first lateral surface regions a2 are formed to be folded at opposite lateral portions of the front surface region a1 of the airbag cushion 100 and a lower surface region a3 is formed to be folded at a lower end of the front surface region a1 and the second panel B in which second lateral surface regions b2 are formed to be folded at opposite lateral portions of the rear surface region b1 of the airbag cushion 100 and an upper surface region b3 is formed to be folded at an upper end of the rear surface region b1. As the edge of the first panel A and the edge of the second panel B are connected to each other, the airbag cushion 100 can be formed.

At this point, each of the first lateral surface regions a2 has a shape that transversely narrows from an upper end toward a lower end, and each of the second lateral surface regions b2 has a shape that transversely widens from an upper end toward a lower end.

Specifically, the front surface region a1, the first lateral surface regions a2, and the lower surface region a3 of the first panel A are shaped into triangular surface shapes.

A first oblique edge of each of the first lateral surface regions a2 is connected to each of both oblique edges of the front surface region a1, and a folding line FL is formed at a portion where the front surface region a1 and each of the first lateral surface regions a2 are connected to each other. Based on the folding line FL, the first lateral surface regions a2 are folded with respect to the front surface region a1.

Furthermore, a lower edge of the lower surface region a3 is connected to a lower edge of the front surface region a1, and a folding line FL is formed at a portion where the front surface region a1 and the lower surface region a3 are connected to each other. Based on the folding line FL, the lower surface region a3 is folded with respect to the front surface region a1.

As described above, the first lateral surface regions a2 and the lower surface region a3 are continuously folded with respect to the three edges of the front surface region a1, thereby forming the first panel A.

Furthermore, the rear surface region b1, the second lateral surface regions b2, and the upper surface region b3 of the second panel B are shaped into triangular surface shapes.

A first oblique edge of each of the second lateral surface regions b2 is connected to each of both oblique edges of the rear surface region b1 and a folding line FL is formed at a portion where the rear surface region b1 and each of the second lateral surface regions b2 are connected to each other. Based on the folding line FL, the second lateral surface regions b2 are folded with respect to the rear surface region b1.

Furthermore, a lower edge of the upper surface region b3 is connected to a lower edge of the rear surface region b1 and a folding line FL is formed at a portion where the rear surface region b1 and the upper surface region b3 are connected to each other. Based on the folding line FL, the upper surface region b3 is folded with respect to the rear surface region b1.

As described above, the second lateral surface regions b2 and the upper surface region b3 are continuously folded with respect to the three edges of the rear surface region b1, thereby forming the second panel B.

Specifically, a second oblique edge of each of the first lateral surface regions a2 and a second oblique edge of each of the second lateral surface regions b2 are connected to each other by the sewing manner, lower edges of the first lateral surface regions a2 and both oblique edges of the upper surface region b3 are connected to each other by the sewing manner, and lower edges of the second lateral surface regions b2 and both oblique edges of the lower surface region a3 are connected to each other by the sewing manner.

Therefore, as the edge of the first panel A and the edge of the second panel B are connected to each other to form the airbag cushion 100, the number of panels can be minimized and sewing work of the airbag cushion 100 can be efficiently performed.

Furthermore, a first inlet region a4 is formed to extend at an end of the lower surface region a3, a second inlet region b4 is formed to extend at ends of the second lateral surface regions b2, and an edge of the first inlet region a4 and an edge of the second inlet region b4 are connected to each other, thereby forming the gas inlet 130.

In other words, as the first inlet region a4 is formed at the lower surface region a3 and the second inlet region b4 is formed at a portion where the rear surface region b1 and the opposite second lateral surface regions b2 are connected to each other, when the first inlet region a4 and the second inlet region b4 are sewn, the hose-shaped gas inlet 130 is formed to communicate with the inside space of the airbag cushion 100.

Figure 17:
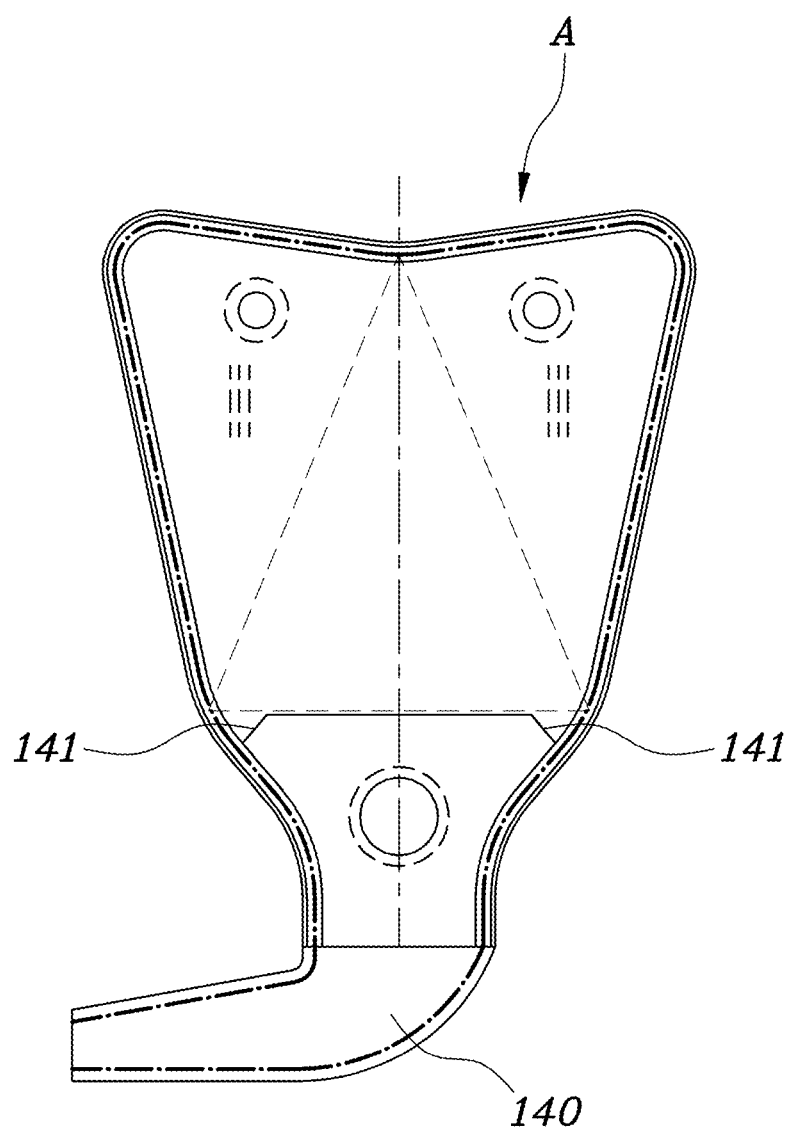
FIG. 17 is a view showing a structure in which a diffuser is coupled to the airbag cushion according to embodiments of the present invention.

Meanwhile, FIG. 17 is a view showing a structure in which a diffuser 140 is coupled to the airbag cushion 100 according to embodiments of the present invention.

Referring to the drawing, the gas inlet 130 is formed at an end of the airbag cushion 100, the diffuser 140 is connected to the gas inlet 130 and the inflator 300 while being located therebetween, and the diffuser 140 may be formed such that a sectional area of a passage widens from the inflator 300 toward the gas inlet 130.

At this point, the diffuser 140 includes one or more outlets 141 inside the airbag cushion 100, so that the gas supplied from the inflator 300 may be discharged into the airbag cushion 100.

Furthermore, the diffuser 140 serves as the inner hose 400 as described above, and a separate outer hose 500 may be provided into a shape that wraps the diffuser 140.

Figure 18:
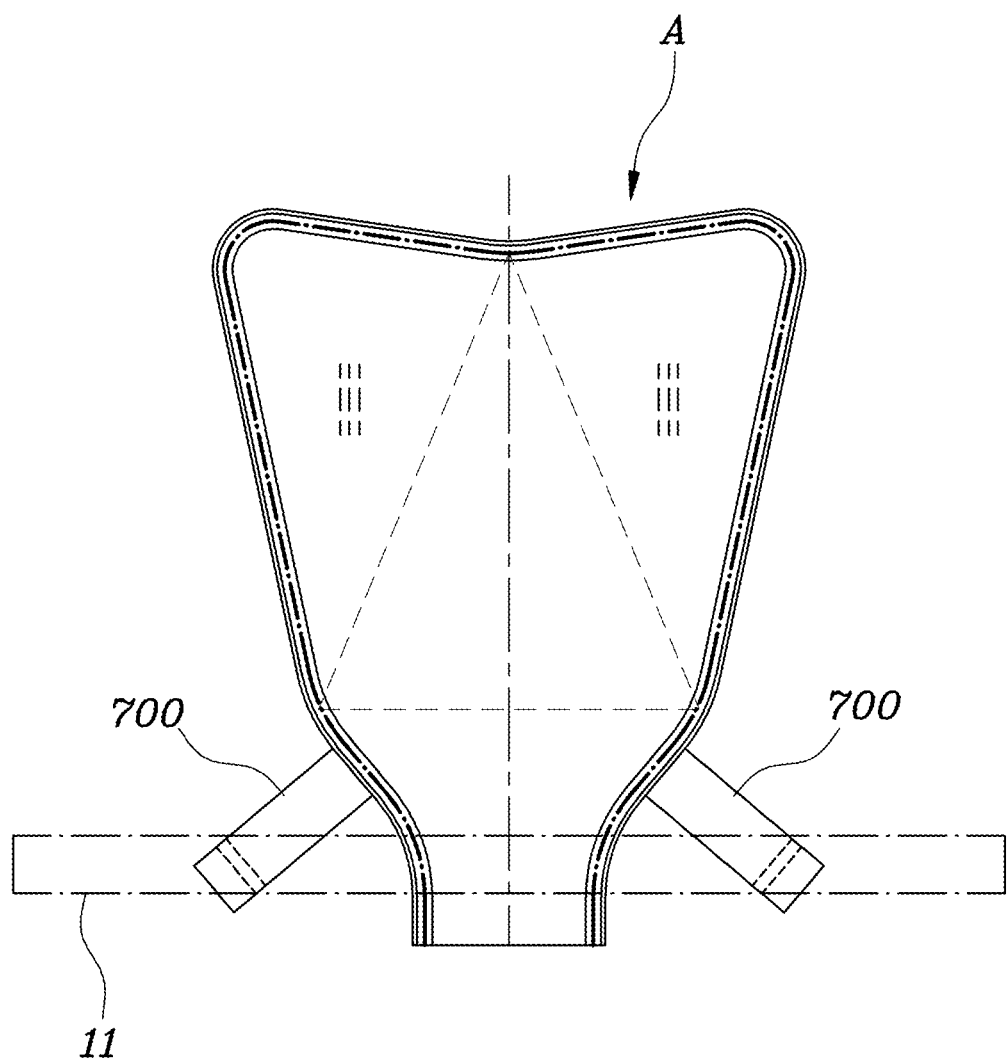
FIG. 18 is a view showing a structure in which an external tether is connected to the airbag cushion and a webbing according to embodiments of the present invention while being located therebetween.

Meanwhile, FIG. 18 is a view showing a structure in which an external tether 700 is connected to the airbag cushion 100 according to embodiments of the present invention and the webbing while being located therebetween.

Referring to the drawing, the external tether 700 may be connected between the webbing of the seat belt 12, from which the airbag cushion 100 is deployed, and the airbag cushion 100.

For example, as a first end of the external tether 700 is connected to each of opposite portions of the panel forming the lower surface of the airbag cushion 100 and a second end of the external tether 700 is connected to the wrap webbing 11, the airbag cushion 100 can be stably fixed to the wrap webbing 11.

At this point, the external tether 700 may be formed to be integrated with the panel forming the airbag cushion 100, but the external tether 700 may be formed as a separate object and be connected between the panel of the airbag cushion 100 and the wrap webbing 11.

Figure 19:
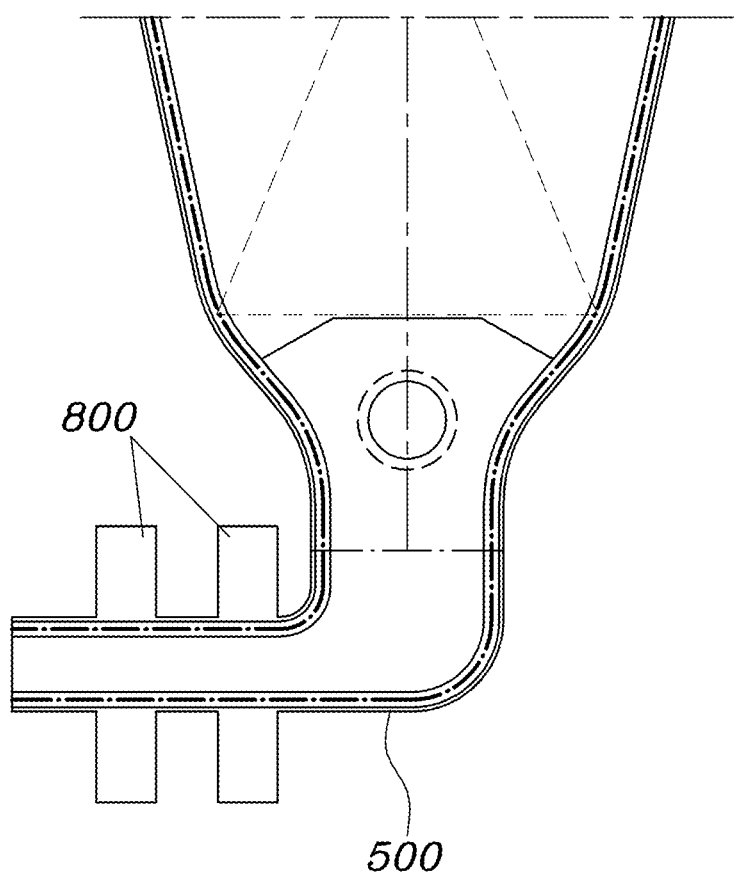
FIG. 19 is a view showing a webbing fixing part formed at the hose unit according to embodiments of the present invention.
Figure 20:
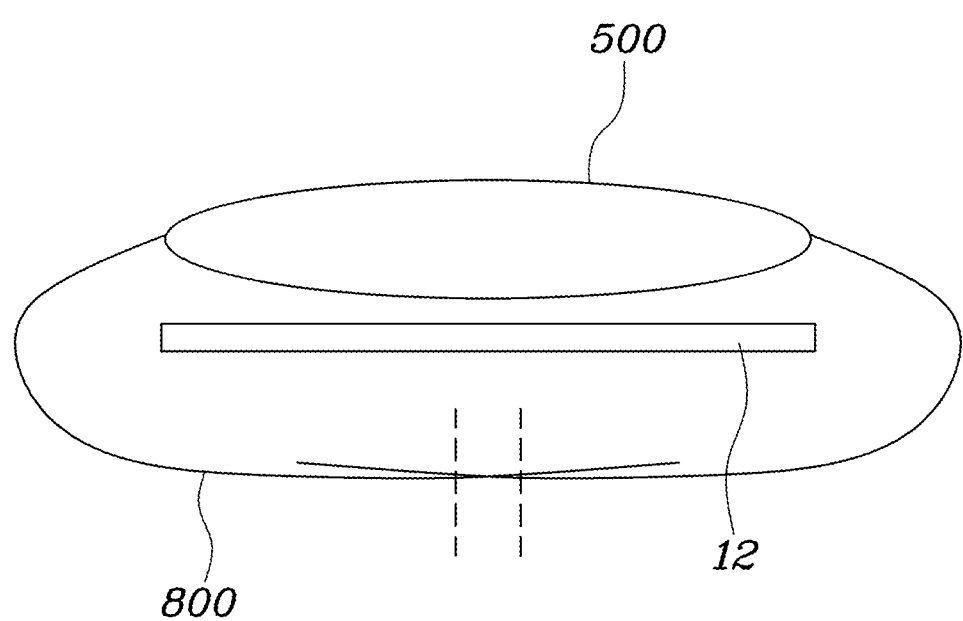
FIG. 20 is a view showing the hose unit and the webbing fixed to each other via the webbing fixing part according to embodiments of the present invention.

Meanwhile, FIG. 19 is a view showing a webbing fixing part 800 formed at the hose unit according to embodiments of the present invention. FIG. 20 is a view showing the hose unit and the webbing fixed to each other via the webbing fixing part 800 according to embodiments of the present invention.

Referring to the drawings, the airbag includes the hose unit supplying the gas supplied from the inflator 300 into the airbag cushion 100 and the webbing fixing part 800 formed by protruding on an outer surface of the hose unit and fixed in a shape that wraps the webbing of the seat belt 12.

In other words, in the process of flowing the gas generated from the inflator 300 into the airbag cushion 100 via the hose unit, unstable flow may be generated due to high-pressure gas.

Therefore, in embodiments of the present invention, a plurality of webbing fixing parts 800 is formed to protrude in opposite directions perpendicular to a longitudinal direction of the hose unit.

The wrap webbing 11 is wrapped by the webbing fixing part Boo and sewn into a ring shape.

Accordingly, as the hose unit is prevented from moving out of a certain distance from the wrap webbing 11, separation of the hose unit is prevented.

As described above, according to embodiments of the present invention, the airbag cushion 100 is deployed such that the lower end thereof has the shape that widens toward the space in front of the passenger, so that the airbag cushion 100 is supported by the upper parts of the passenger's legs to stably restrain the upper body of the passenger. Furthermore, the airbag cushion 100 is deployed such that an upper end thereof has the shape that widens toward the passenger, so that a region where the head of the passenger is supported widens and the passenger is safely protected.

Furthermore, the airbag cushion 100 has the shape of which the upper and lower portions transversely narrow, so that the protection region of the passenger is secured and the entire size and volume of the airbag cushion 100 are reduced. Therefore, deterioration of the comfort of wearing of the seat belt 12 when the airbag cushion 100 is received inside the seat belt 12 is prevented, and the capacity of the inflator 300 is reduced.

Meanwhile, although the present invention has been illustrated only with respect to the above-described specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. An airbag for a seat belt, the airbag comprising:
an airbag cushion deployable from the seat belt;
a first support having a shape that widens toward a space in front of a passenger at a lower portion of the airbag cushion when the airbag cushion is in a deployed state, wherein the first support is configured to be supported by thighs of the passenger; and
a second support having a shape that widens toward the passenger at an upper portion of the airbag cushion when the airbag cushion is in the deployed state, wherein the second support is configured to support a head of the passenger;
a gas inlet provided at an end of the airbag cushion; and
a diffuser connected to the gas inlet and an inflator while being located therebetween, wherein the diffuser has a shape in which a sectional area of a passage widens from the inflator toward the gas inlet.

2. The airbag of claim 1, wherein the first support is disposed such that a lower surface of the airbag cushion transversely widens from the passenger toward the space in front of the passenger.

3. The airbag of claim 1, wherein the second support is disposed such that an upper surface of the airbag cushion transversely widens from the space in front of the passenger toward the passenger.

4. The airbag of claim 1, further comprising a tether located between and connected to opposite inner surfaces of the airbag cushion.

5. The airbag of claim 4, wherein the tether is further connected to a front surface or an upper surface of the airbag cushion.

6. The airbag of claim 1, wherein:
a front surface region of the airbag cushion has a shape that transversely widens from an upper front end of the airbag cushion toward a lower front end of the airbag cushion when the airbag cushion is in the deployed state; and
a tether is connected to lateral surface regions respectively connected to opposite lateral portions of the front surface region while being located therebetween; and
the tether is connected to the lateral surface regions to lean toward a transversely narrowed portion of the front surface region.

7. The airbag of claim 1, wherein:
a rear surface region of the airbag cushion has a shape that transversely widens from a lower rear end of the airbag cushion toward an upper rear end of the airbag cushion;
a tether is connected to lateral surface regions respectively connected to opposite lateral portions of the rear surface region while being located therebetween; and
the tether is connected to the lateral surface regions to lean toward a transversely narrowed portion of the rear surface region.

8. The airbag of claim 1, wherein the airbag cushion comprises:
a first panel comprising a first region having a shape that transversely widens from a first end toward a second end thereof, second regions foldable at opposite sides of the first region, and a third region foldable at the second end of the first region; and
a second panel comprising a fourth region having a shape that transversely narrows from a first end to a second end thereof, fifth regions foldable at opposite sides of the fourth region, and a sixth region foldable at the first end of the fourth region; and wherein an edge of the first panel and an edge of the second panel are connected to each other to define the airbag cushion.

9. The airbag of claim 1, further comprising an external tether connected to a webbing of the seat belt where the airbag cushion is deployed and the airbag cushion while being located therebetween.

10. The airbag of claim 1, further comprising:
a hose unit configured to supply gas supplied from an inflator to the airbag cushion; and
a webbing fixing part formed by protruding on an outer surface of the hose unit and fixed in a shape that wraps a webbing of the seat belt.

11. An airbag for a seat belt, the airbag comprising:
an airbag cushion deployable from the seat belt;
a first support having a shape that widens toward a space in front of a passenger at a lower portion of the airbag cushion when the airbag cushion is in a deployed state, wherein the first support is configured to be supported by thighs of the passenger;
a second support having a shape that widens toward the passenger at an upper portion of the airbag cushion when the airbag cushion is in the deployed state, wherein the second support is configured to support a head of the passenger;
an inner hose through which gas supplied from an inflator passes and is supplied into the airbag cushion, the inner hose comprising a material with airtightness; and
an outer hose having a shape wrapping the inner hose and comprising a material with higher strength than the inner hose.

12. The airbag of claim 11, wherein a circumference of the inner hose is longer than a circumference of the outer hose.

13. The airbag of claim 11, wherein:
the inflator and the inner hose are fastened to each other by a first fastener;
the outer hose is longer toward the inflator than the inner hose; and
the inflator and the outer hose are fastened to each other by a second fastener.

14. The airbag of claim 11, wherein:
a hose fixing part is provided by partially extending an end of the outer hose in a longitudinal direction of the outer hose; and
the hose fixing part is connected to the airbag cushion.

15. The airbag of claim 14, wherein the hose fixing part and the airbag cushion are connected to each other by a connector.

16. The airbag of claim 14, wherein the hose fixing part is directly connected to the airbag cushion.

17. An airbag for a seat belt, the airbag comprising:
an airbag cushion deployable from the seat belt, wherein the airbag cushion comprises:
a first panel comprising first lateral surface regions foldable at opposite sides of a front surface region of the airbag cushion and a lower surface region foldable at a lower end of the front surface region; and
a second panel comprising second lateral surface regions foldable at opposite sides of a rear surface region of the airbag cushion and an upper surface region foldable at an upper end of the rear surface region, wherein an edge of the first panel and an edge of the second panel are connected to each other to define the airbag cushion;
a first support having a shape that widens toward a space in front of a passenger at a lower portion of the airbag cushion when the airbag cushion is in a deployed state, wherein the first support is configured to be supported by thighs of the passenger; and
a second support having a shape that widens toward the passenger at an upper portion of the airbag cushion when the airbag cushion is in the deployed state, wherein the second support is configured to support a head of the passenger.

18. The airbag of claim 17, wherein:
each of the first lateral surface regions has a shape that transversely narrows from an upper end toward a lower end thereof; and
each of the second lateral surface regions has a shape that transversely widens from an upper end toward a lower end thereof.

19. The airbag of claim 17, wherein:
a first inlet region extends at an end of the lower surface region;
a second inlet region extends at ends of the second lateral surface regions; and
an edge of the first inlet region and an edge of the second inlet region are connected to each other to define a gas inlet.

* * * * *